United States Patent [19]
Dixon et al.

[11] Patent Number: 6,058,424
[45] Date of Patent: May 2, 2000

[54] SYSTEM AND METHOD FOR TRANSFERRING A SESSION FROM ONE APPLICATION SERVER TO ANOTHER WITHOUT LOSING EXISTING RESOURCES

[75] Inventors: Peggy PakFan Dixon; Danling Shi; Richard Lee Verburg; Donald Edwin Wood, all of Austin, Tex.

[73] Assignee: International Business Machines Corporation, Armonk, N.Y.

[21] Appl. No.: 08/972,053

[22] Filed: Nov. 17, 1997

[51] Int. Cl.⁷ .................................................. G06F 13/00
[52] U.S. Cl. ................................. 709/226; 714/4
[58] Field of Search .................... 709/201, 220, 709/226, 228, 300; 714/4, 6, 13, 20

[56] References Cited

U.S. PATENT DOCUMENTS

| | | | |
|---|---|---|---|
| 4,914,586 | 4/1990 | Swinehart et al. | 707/101 |
| 5,386,544 | 1/1995 | Nakamura | 714/15 |
| 5,499,046 | 3/1996 | Schiller et al. | 348/6 |
| 5,566,299 | 10/1996 | Billings et al. | 714/4 |
| 5,574,778 | 11/1996 | Ely et al. | 379/207 |
| 5,633,810 | 5/1997 | Mandal et al. | 370/431 |
| 5,652,908 | 7/1997 | Douglas et al. | 714/4 |
| 5,675,723 | 10/1997 | Ekrot et al. | 714/4 |
| 5,696,895 | 12/1997 | Hemphill | 714/4 |
| 5,713,017 | 1/1998 | Lin et al. | 707/8 |
| 5,748,870 | 5/1998 | Tims et al. | 714/4 |
| 5,781,716 | 7/1998 | Hemphill et al. | 714/4 |
| 5,796,934 | 8/1998 | Bhanot et al. | 714/4 |
| 5,812,748 | 9/1998 | Ohran et al. | 714/4 |
| 5,812,751 | 9/1998 | Ekrot et al. | 714/4 |
| 5,829,019 | 10/1998 | Thompson et al. | 711/113 |
| 5,845,082 | 12/1998 | Murakami | 709/226 |

*Primary Examiner*—Moustafa M. Meky
*Attorney, Agent, or Firm*—Leslie A. VanLeeuwen; Thomas E. Tyson

[57] ABSTRACT

The present invention allows a multimedia session to be transferred from one application server to another in the event that the original application server fails, and also allows a session to be cooperatively transferred from one application server to another, even though the original application server is still available for use. The new application server may be in the same multimedia computer (i.e. the same physical machine) as the original application server, or the new application server may be in a different computer. The session is transferred without losing existing resources, and callbacks that occur during the session takeover process are not lost. An application server which owns a multimedia session may enable that session for takeover, by using an Application Programming Interface (API). The API returns session takeover data which must be available to a new application server in the event of a takeover. The new application server uses the session takeover data to reconstruct information, including access information, regarding all resources necessary to keep the session executing.

35 Claims, 5 Drawing Sheets

SYSTEM AND METHOD FOR TRANSFERRING A SESSION FROM ONE APPLICATION SERVER TO ANOTHER WITHOUT LOSING EXISTING RESOURCES

FIELD OF THE INVENTION

The present invention relates to the field of information handling systems, and, more particularly, to a system and method for transferring a session from one application server to another without losing existing resources.

BACKGROUND OF THE INVENTION

In network computer systems, a plurality of client computers are typically connected together, and to one or more server computers in the network. A network may be established through the hard-wired interconnection of a plurality of computer terminals and servers in a local network, or on a wider scale such as an intranet, or the Internet or World Wide Web, which may include telecommunication links. In any case, the network server or servers act as the central control unit for providing access to files, programs, and program execution to the individual computers connected within the network.

With the increasing use of networks in general and multimedia presentations in particular, new opportunities are being developed for the design and delivery of data resources and assets in multimedia networks. In many applications, multimedia presentations are designed and created for delivery and presentation to both digital and analog display systems. For example, a user, or "client," on a network or on the Internet may select a particular video display segment or movie to be presented on the user's display device. The user may also create an "on-the-fly" presentation by selecting a series of "active" video display segments to be presented on the user's display device. Alternatively, a network administrator or manager may wish to assemble one or a series of "active" video segments on a server to be available to individual users on demand. In another application, a broadcast station may select and call for the presentation of one or a series of video segments for broadcast through associated stations to analog display devices of subscribers.

A client requests multimedia assets by communicating with a multimedia server. The component within the multimedia server which communicates with the client is sometimes referred to as an application server. If the application server fails, it is very disruptive to the client. If the failure occurs while a multimedia asset is playing, data may be lost, and the user may be unable to continue viewing the asset which was playing. Thus, in most multimedia systems, there is a high availability requirement for application servers.

Consequently, there is a need for a system and method for transferring control from one application server to another in a multimedia system. It would be desirable to allow a session to be taken over by a new application server, either by a request from the original application server, or after the original application server unexpectedly terminates. It would also be desirable if the session takeover could be accomplished without losing existing resources. It would be further desirable to be able to designate which sessions may be taken over.

SUMMARY OF THE INVENTION

Accordingly, the present invention is directed to a system and method for allowing a session to be transferred from one application server to another in a multimedia system without losing existing resources. The present invention allows a multimedia session to be transferred from one application server to another in the event that the original application server fails, and also allows a session to be cooperatively transferred from one application server to another, even though the original application server is still available for use. The new application server may be in the same multimedia computer (i.e. the same physical machine) as the original application server, or the new application server may be in a different computer. When a session is transferred, no existing resources are lost. Further, callbacks that occur during the session takeover process are not lost.

The present invention allows an application server that owns a multimedia session to enable that session for takeover. The application server uses an API (Application Programming Interface) to enable the session for takeover. The API returns session takeover data which must be available to a new application server in the event of a takeover. The new application server is responsible for determining that a session needs to be taken over due to failure of the original application server. Alternately, if the takeover is cooperative, the two application servers may communicate with each other to determine when to begin the takeover process. The new application server uses the session takeover data to reconstruct information, including access information, regarding all necessary session resources in order to keep the session executing. In addition, while the session is being taken over, a control server queues all callbacks until the takeover process is complete, and then sends the callbacks to the new application server.

One advantage of the present invention is that a multimedia session is transferred from one application server to another in a manner which is non-disruptive to the user of the multimedia asset, and without losing resources associated with the multimedia session. A further advantage of the present invention is that the original application server and the new application server may reside in the same or separate computers.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
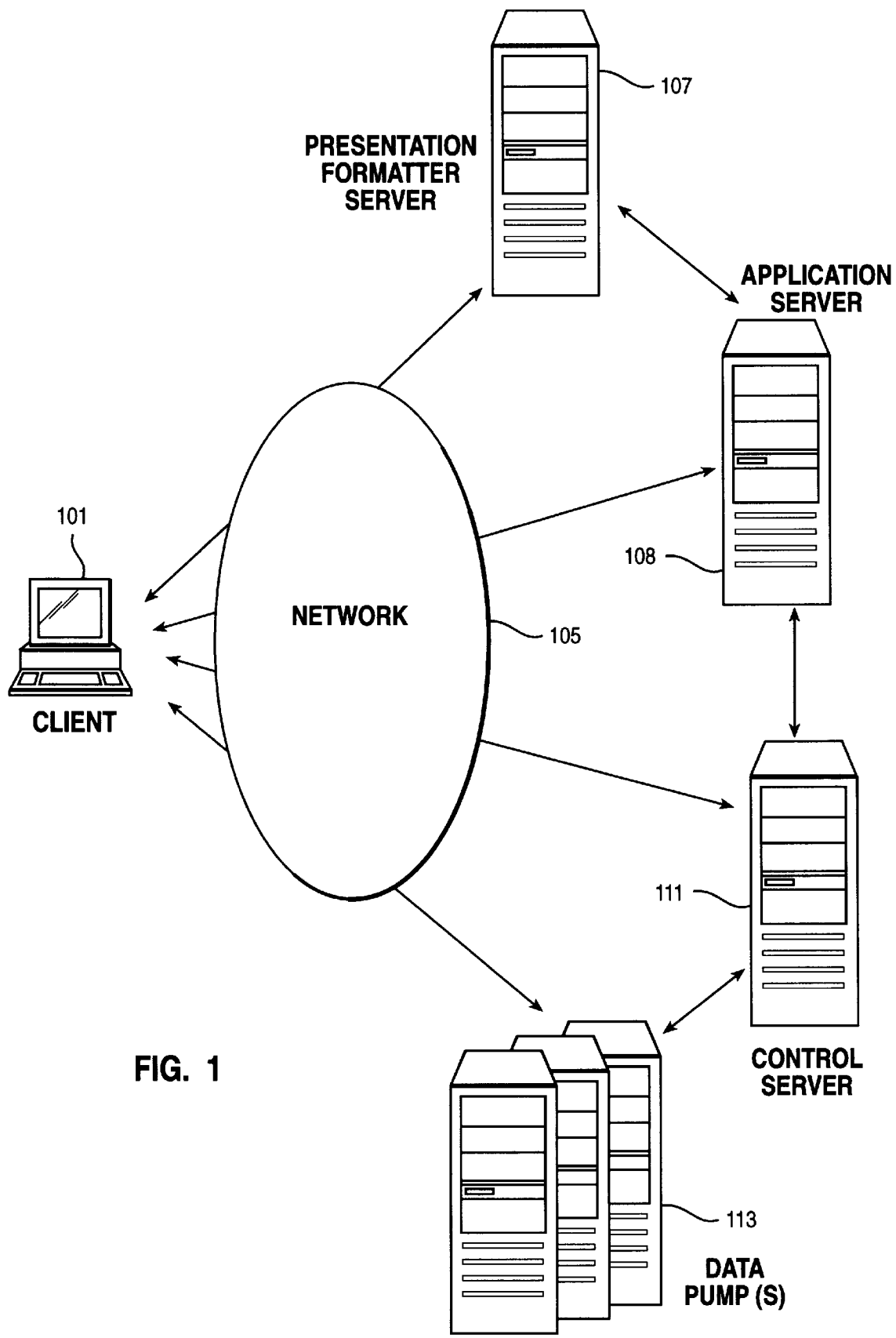
FIG. 1 is a diagram of a networked computer system in which the present invention may be implemented.

The invention may be implemented on a variety of hardware platforms, including personal computers, workstations, mini-computers, and mainframe computers. Many of the steps of the method of the present invention may be advantageously implemented on parallel processors of various types. With reference to FIG. 1, there is shown a diagram of the main system components for an exemplary multimedia server embodiment in a network environment. In general, circuit details beyond those shown in the figures are not specified to any greater extent than that considered necessary for the understanding and appreciation of the underlying concepts of the present invention, and in order not to distract from the teachings of the present invention.

The illustrated components of FIG. 1 include client terminal 101, which can include a digital video terminal in a personal computer arrangement or an analog video terminal arranged to receive analog data for display. Client terminal 101 is connected through network configuration 105 to presentation formatter server 107. The server system, in addition to formatter server 107, further includes application server 108, control server 111 and data pump 113 (which may include several data pumps in parallel), which are connected together to provide various multimedia functions including asset/query selection, asset control and asset delivery. The main functional server units 107, 108, 111 and 113 may be arranged in separate machines as illustrated, or may be combined in one or more server devices. For example, presentation formatter server 107 and application server 108 are sometimes combined in one server device. Application server 108 is also sometimes combined with control server 111 in a controller machine. Furthermore, there may be several application servers 108 present in the multimedia system, and they may be present in a single machine or several machines. The multimedia server can store and deliver streamed, compressed audio and video file content.

Presentation formatter server 107 controls how clients view information on available assets and select specific assets for viewing. Formatter server 107 also runs an HTTP link system to enable communication between a client Web browser and the server system. Data pump 113 stores multimedia files, which are also referred to as multimedia assets, and delivers assets to the client through the use of data exporter software. Data pump 113 is arranged to play a file to a client across network 105 as shown. Application server 108 and control server 111 coordinate the various functions of the system, and are discussed in detail below, with reference to FIG. 2.

Figure 2:
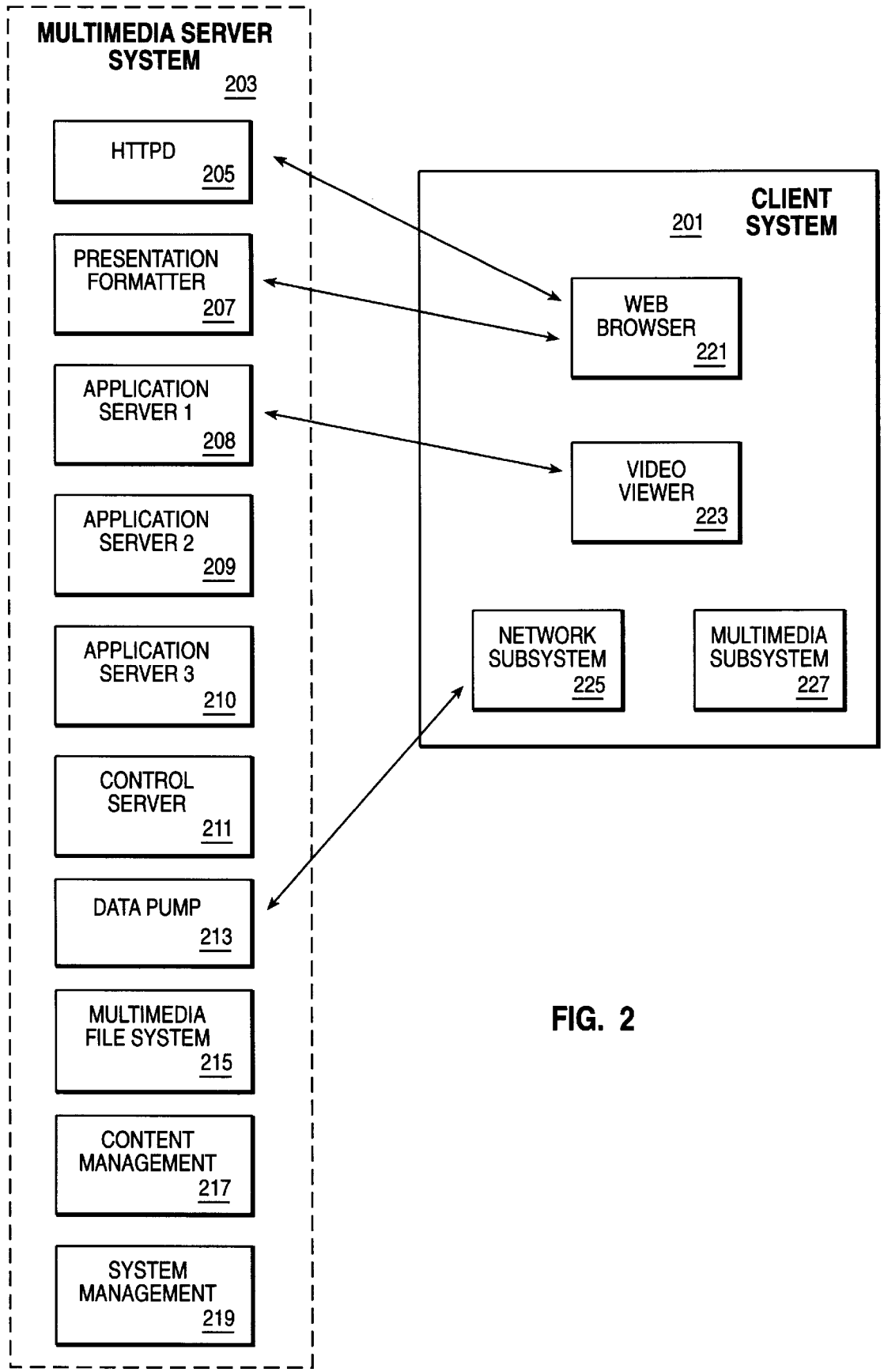
FIG. 2 is a block diagram showing selected components and subsystems of the networked computer system of FIG. 1.

FIG. 2 is a block diagram depicting further details of selected components of the networked system of FIG. 1. Note that dashed lines around multimedia server system 203 indicate that the components of server system 203 may reside on one or more physical machines. Further, note that three application servers, 208, 209, and 210 are depicted in FIG. 2. As discussed above, many application servers may be present in multimedia server system 203. As shown in FIG. 2, multimedia server system 203 includes HTTPD unit 205 for Web communications, presentation formatter 207, application servers 208, 209, and 210, control server 211, data pump arrangement 213 (which may include a plurality of data pumps in parallel), and multimedia file system 215. The multimedia server system also includes content management data base 217 and system management unit 219.

The various components of multimedia server system 203 are arranged for connection to client system 201, which may include Web browser 221, video viewer device 223, as well as network subsystem 225 and multimedia subsystem 227. Control server 211 is the main control point for the setup and delivery of an asset to client 201. Control server 211 functionality includes the selection of data pumps and command processing. By controlling the number of multimedia or audio/video data streams, control server 211 ensures that the quality of the service is maintained across the system.

Control server 211 may provide many multimedia file data stream control functions, such as the functions of "play," "stop," "pause," "rewind," and "forward." Control server 211 also provides resource management, including admission control and load balancing, for both playing streams and content loading. In addition, control server 211 stores a catalog of multimedia assets available on data pump 213.

Application server 208 handles communications with a client requesting an asset. As depicted in FIG. 2, there may be more than one application server in a particular multimedia server system. Note that a single application server may handle communications with more than one client. For example, application server 208 receives requests from client 201, and can issue commands to control individual streams. These commands are then carried out by control server 211. Application server 208 can also include an optional content management database 217, which contains additional information concerning the available assets (e.g., such information as the director, the subject, and/or the actors for a particular video presentation).

Multimedia content management is often handled through HTML forms on the server home page. Users can add, delete, change, and view "attributes" of assets. Asset attributes include information such as encoding type, frame rate and play rate. Such attributes describe the characteristics of data in the file system and tell the server how to serve actual multimedia data stored in the file system. The server includes a tool that automatically determines the encoding type, frame rate, and play rate when content is loaded through HTML forms. The attributes for a file can be complemented by additional information describing the asset. Such information, which may be defined by the user, can include additional informational items such as title, subject, actors, director, and date released.

Multimedia server system 203 is arranged for storage and delivery of video and audio presentations. Multimedia assets are typically placed in file system 215 for storage and retrieval using a method called striping. Striping spreads the content of a multimedia file across all of the disks in a file system for optimized performance. Client code is installed on a client machine to enable the client to access server assets.

There are many ways in which client 201 may access multimedia assets. In the described embodiment, multimedia server system 203 implements three predefined presentation formatter programs in presentation formatter 207. A first video selection allows client 201 to link to specific assets directly from an HTML page. In this mode, a page must be created with an explicit link to each video stored. This approach requires no additional asset information to be stored in application server 208, and only basic attributes (e.g., encoding type, frame rate, and play rate) are available and supplied on the initial HTML page. Use of this presentation formatter is best when there are few assets and they are not added or deleted often.

A second presentation formatter, herein referred to as Video-on-Demand, or VOD, allows client 201 to select a video from a dynamically generated list. This method avoids having to update a list of links each time an asset is added or deleted. Use of the VOD presentation formatter requires the creation of a database of additional asset information (e.g., title, subject, etc.), that can be queried by client 201. This database preferably exists in application server 208. Presentation formatter 207 allows client 201 to search content management database 217 and view a list of only those assets that are of interest to the client. For example, a client might search the system for all videos directed by a certain known director and released after 1977.

A third presentation formatter is referred to as the Multicast Video Guide. Using this formatter, a server administrator can schedule video broadcasts to a group of clients. This formatter allows clients to view a list of currently scheduled jobs and clients can join or leave a multicast session at any time. The three formatters described above can be used directly or modified, or other formatters may be written using API (Application Programming Interface) calls provided by multimedia server system 203.

The following process describes in detail an exemplary methodology implemented in delivering a server asset to a client through the VOD presentation formatter, which was referred to above in more general terms. When using the Video Selection Presentation formatter, where the user does not narrow a selection by search criteria, the process may skip directly to a subsequent step at which the client proceeds immediately to select a multimedia asset from a listing on an HTML page presented to the client.

Using the VOD presentation formatter, client web browser 221 requests from presentation formatter server 207 an HTML page containing links to a presentation formatter program. Presentation formatter server 207 returns the requested page, and client web browser 221 then selects a search function from the page to initiate a search from the available assets. Presentation formatter server 207 receives the request and runs the Video-On-Demand, or VOD, presentation formatter program. The VOD formatter dynamically creates a search form based on the fields in application server content management database 217 and returns the form via presentation formatter server 207 to client 201. Client 201 completes the search field and sends the data to presentation formatter server 207. Server 207 receives the request and runs the VOD presentation formatter program. The VOD presentation formatter sends the query to application server 208, which in turn queries content management database 217. The results are returned to the VOD presentation formatter which dynamically builds an HTML page, and returns the page containing the search results to client 201. The preceding steps are repeated as necessary to narrow the search.

Client 201 then selects an asset from the HTML page. Presentation formatter server 207 receives the request and runs the VSP (video selection presentation) formatter program. The VSP formatter passes the selection request to application server 208, where an HTML metafile is created containing the pertinent information regarding the selected asset. The metafile is returned via presentation formatter server 207 to client 201. Client web browser 221 receives the HTML metafile, and, based upon the encoding type of the video, launches the video client code. This invokes a multimedia player, e.g. video viewer 223, on the client system to play back the asset. The multimedia or video client code initiates a session with application server 208 to start the playback. Note that a session is a lasting connection between a client and an application server, involving the exchange of data between the client and the application server. Application server 208 opens a session with control server 211 to initiate the playing of the selected asset. Once the asset is playing, the client multimedia code uses the session to control the playback using VCR-style functions. Control server 211 contacts the appropriate data pump 213 to initiate a data delivery session with client 201. Once the session is connected, the asset can be started immediately or at the request of client 201. Data pump 213 streams the data to client 201, and client 201 receives the data into its network subsystem 225 where data is passed to the multimedia player for presentation.

Application server 208 may fail while an asset is playing. The present invention allows a multimedia session to be transferred from one application server to another in the event that the original application server fails. The present invention also allows a session to be cooperatively transferred from one application server to another. This allows a session to be transferred even though the original application server is still available for use. The new application server may be in the same multimedia computer (i.e. the same physical machine) as the original application server, or the new application server may be in a different computer. When a session is transferred, no existing resources are lost. Further, callbacks that occur during the session takeover process are not lost.

When a multimedia session is initiated, a client library is typically used by the application server to establish the connection and handle requests, such as remote procedure call (RPC) requests. The client library contains information about the control server, information about the multimedia session, and handles. If the session is transferred to another application server, all of this information must be reconstructed in the new application server. The new application server also has to be given enough information (e.g., number and types of handles) to build its state tables.

The present invention allows an application server that owns a multimedia session to enable that session for takeover. The application server uses an API (Application Programming Interface) to enable, or authorize, the session for takeover. The API returns session takeover data which must be available to a new application server in the event of a takeover. The new application server is responsible for determining that a session needs to be taken over due to failure of the original application server. Alternately, if the takeover is cooperative, the two application servers may communicate with each other to determine when to begin the takeover process. The new application server uses the session takeover data to reconstruct information regarding all necessary resources in order to keep the session executing. In addition, while the session is being taken over, the control server queues all callbacks until the takeover process is complete, and then sends the callbacks to the new application server.

Figure 3:
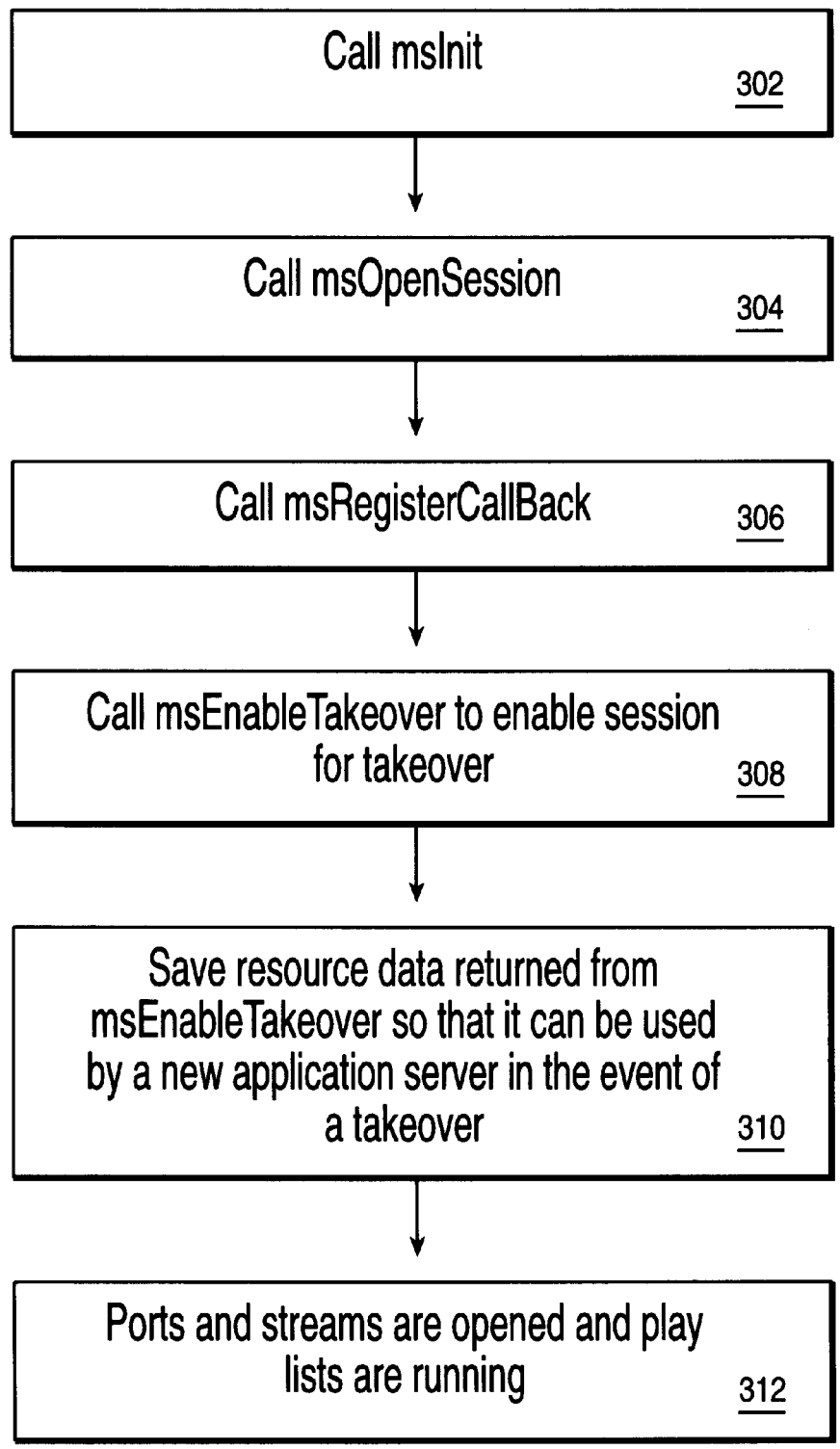
FIG. 3 is a flow chart illustrating a method for enabling a session for takeover according to the teachings of the present invention.

Referring now to FIG. 3, a method for enabling, or authorizing, a session for takeover will now be described. When a session begins, the owner of the session, typically an application server, issues standard API calls to the control server, such as msInit (step 302), msOpenSession (step 304), and msRegisterCallBack (step 306). In order to enable the session for takeover, the application server then calls the msEnableTakeover API (step 308). An exemplary syntax for this API is shown below:

```
msRC_t msEnableTakeover(
    msSessionHandle_t      sessionHandle,      //in
    long                   takoverTimeout,     //in
```

-continued

```
    msSessTakeover_t        *sessionTakeover      //out
);
```

The first input parameter, sessionHandle, defines the context of the session. The second input parameter, takeoverTimeout, specifies the amount of time a new application server has in which to take over the session. In the described embodiment, this time is specified in seconds, and may be in the range of 30 to 10,800 seconds. If the session is not taken over in this amount of time, the control server will close the session.

The output parameter, sessionTakeover, is a pointer to a structure which must be made available to the new application server in order to allow the new application server to take over the session. An exemplary sessionTakeover structure is shown below:

```
typedef struct __msSessTakeover_t {
    msSessionHandle_t       sessionHandle;
    msServerName_t          serverLocation;
    msServerInstance_t      serverInstance;
    msAssetGroup_t          assetGroup;
    msAppSignature_t        signature;
    msTimeStamp_t           timestamp;
    char                    reserved[48];
} msSessTakeover_t;
```

When an application server calls the msEnableTakeover API, this structure will be filled with session takeover data. In order to allow another application server to take over the session, the sessionTakeover structure must be made available to the new application server.

Still referring to FIG. 3, the application server saves the data returned in the sessionTakeover structure so that it can be used by a new application server during takeover (step 310). There are many ways in which this data may be accessed by a new application server. For example, the original application server may save the data in a shared file which can then be accessed by the new application server during takeover. Other options include the use of a socket, remote procedure call, shared memory, or pipes. Those skilled in the art will appreciate that there are many ways in which the necessary data may be passed from the original application server to the new application server.

Figure 4:
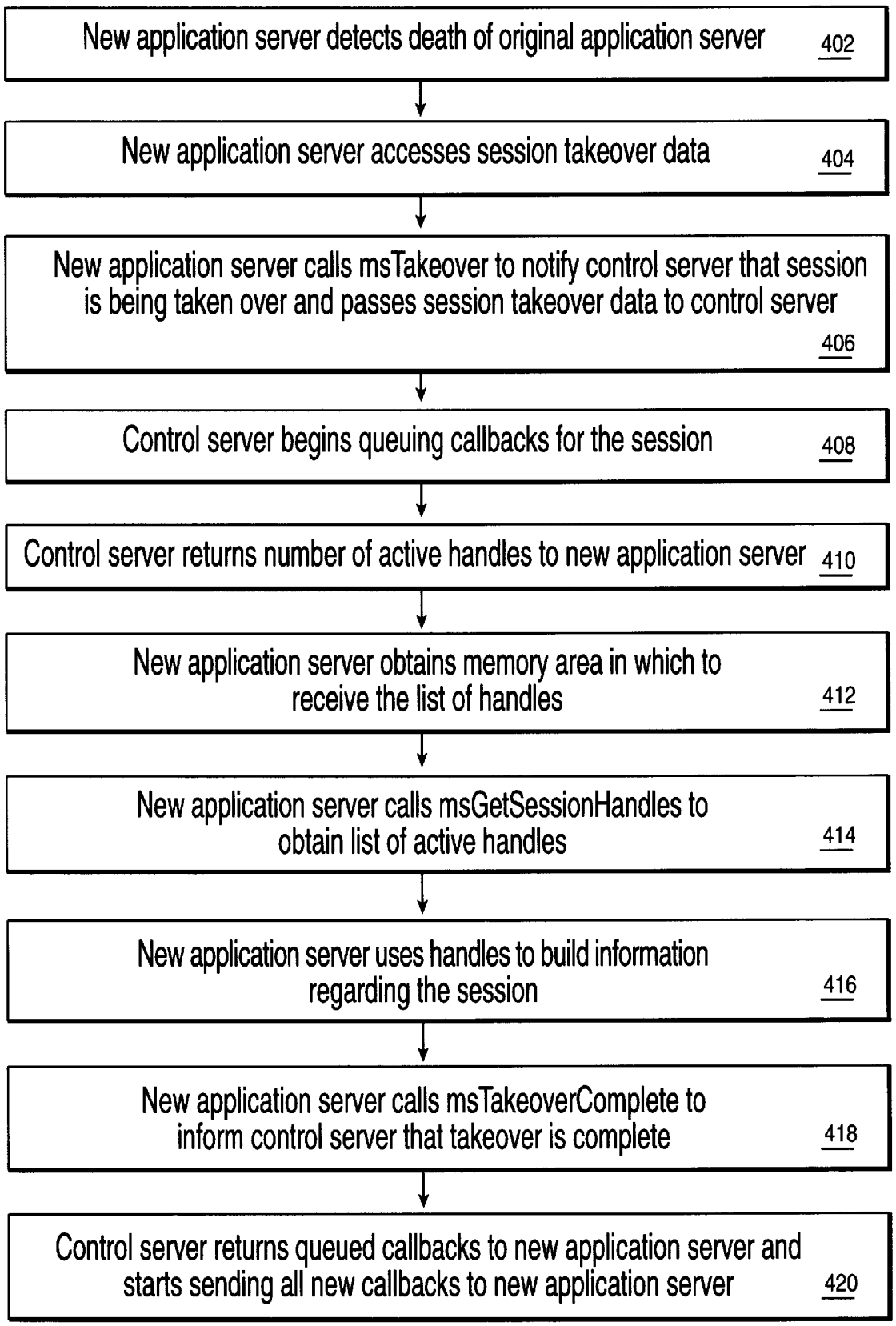
FIG. 4 is a flow chart illustrating a method for transferring a session from one application server to another when the original application server fails.
Figure 5:
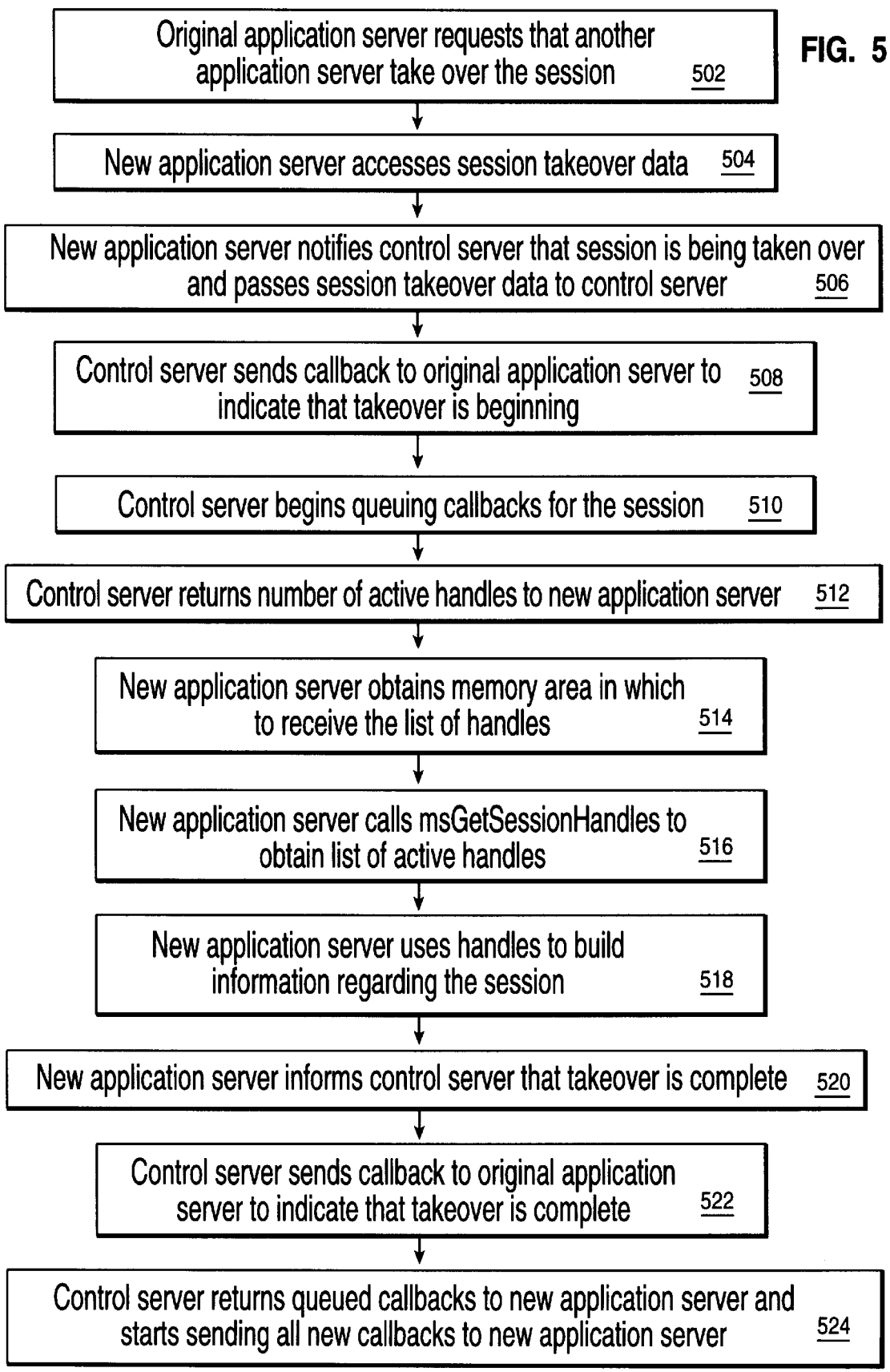
FIG. 5 is a flow chart illustrating a method for cooperatively transferring a session from one application server to another.

After the session has been enabled for takeover, ports and streams are opened, and play lists begin executing (step 312). At this point, the session may be taken over, either cooperatively or if the original application server fails. FIGS. 4 and 5 illustrate methods for session takeover.

Referring now to FIG. 4, a method for taking over a session in the event that the original application server fails will now be described. The new application server detects that the original application server has failed (step 402). Those skilled in the art will appreciate that this failure may be detected in many different ways. For example, a heartbeat message that is sent at regular intervals from the original application server may not be received for a certain period of time, thus indicating that the original application server has failed. Another possibility is that the failure may be detected when the new application server detects a broken socket. Once the new application server detects that the original application server has terminated, the new application server accesses and uses the sessionTakeover data (step 404). As discussed above, with reference to FIG. 3, there are a variety of ways in which this data may be obtained. For example, if the session takeover data has been stored in a shared file, the new application server will read the data from the shared file. If pipes are used, then the new application server would have received the session takeover data at the time the first application server called msEnableTakeover. In this case, the new application server would likely have saved the data for later use.

The new application server then calls the msTakeover API to inform the control server that the session is being taken over (step 406). When the control server is notified that takeover is beginning, it starts queuing all callbacks for the session (step 408). Note that the amount of time the new application server has to complete the takeover process is specified in the msTakeoverTimeout field. Also note that once takeover has started, most API calls will not be allowed until session takeover is complete. API calls issued during the transition time will receive a return code indicating that a takeover is pending. All callbacks received during the takeover process are queued by the control server, and sent to the new application server once the takeover process is complete. An exemplary syntax for the msTakeover API is detailed below:

```
msRC_t msTakeover(
    msSessTakeover_t        sessionTakeover,        //in
    msAppSignature          signature,              //in
    msSessionHandle_t       *sessionHandle,         //out
    msSessTakeoverInfo_t    *sessTakeoverInfo       //out
);
```

The sessionTakeover structure is the structure that was obtained by the application server which previously owned the session. It is used by the new application server to locate the control server and to identify which session is to be taken over. In the current embodiment, signature is reserved. The first output parameter, sessionHandle, is a pointer to the context of the session returned by this call. The next output parameter, sessTakeoverInfo, is a structure containing takeover information. An exemplary sessTakeoverInfo structure is detailed below:

```
typedef struct __msSessTakeoverInfo_t {
    msEventMask             eventMask;
    long                    handleCount;
    char                    reserved[48];
} msSessTakeoverInfo_t;
```

The eventMask indicates the callback settings the session is using. The handleCount is returned to the new application server (step 410), and used to allocate memory before the msGetSessionHandles call (step 412). Exemplary code used to allocate memory in step 412 is as follows:

```
sesshandles = malloc(sessTakeoverInfo.handlecount *
    sizeof(struct __msSessTakeoverHandle_t));
```

The msGetSessionHandles API is used by the new application server to obtain the list of active handles held by the original application server (step 414). An exemplary syntax for msGetSessionHandles is detailed below:

```
msRC_t msGetSessionHandles(
    msSessionHandle_t       sessionHandle,    //in
    long                    count,            //in
    msSessTakeoverHandle_t  *buffer           //out
);
```

The first input parameter, sessionHandle, identifies the context of the session. The second input parameter, count, indicates the number of handles to receive. Note that this count should match the returned handle count from the msSessTakeoverInfo_t structure. The output parameter, buffer, is a pointer to an area in which to receive the handle information. The buffer pointer points to an area defined by the following type definition:

```
typedef struct __msSessTakeoverHandle_t {
    msHandleType  handletype;
    msHandle_t    oldHandle;
    msHandle_t    currentHandle;
    char          reserved[48];
} msSessTakeoverHandle_t;
```

Once the new application server receives the handles, it uses these handles to reconstruct information regarding the resources necessary for the session (step 416). Note that resources include such things as memory, reserved bandwidth, files, ports, etc. Each active handle typically represents consumption of resources. After reconstructing all necessary information regarding session resources, including information needed to access the resources and status information, the new application server notifies the control server that the takeover is complete by using the msTakeoverComplete API (step 418). An exemplary syntax for msTakeoverComplete is shown below:

```
msRC_t msTakeoverComplete(
    msSessionHandle_t  sessionHandle,                    //in
    void               (*callBackAddr) (msEvent_t *)     //in
);
```

The input parameter, sessionHandle, identifies the context of the session. The next input parameter, callBackAddr, is the new callback function address. When msTakeoverComplete returns, all of the queued callbacks, in addition to all future callbacks, are sent from the control server to the routine identified by callBackAddr (step 420).

Referring now to FIG. 5, a method for a cooperative transfer will now be described. Many of the steps of the cooperative transfer are similar to the steps of the takeover process described in FIG. 4. However, there are several differences. The original application server requests that the session be taken over by a new application server (step 502). In the described embodiment, this request is made to another application server. However, those skilled in the art will appreciate that there are a variety of ways in which this request may be made.

The new application server obtains the session takeover data from the original application server (step 504). As discussed above, with reference to FIG. 4, there are many ways in which this data may be obtained. In the case of a cooperative takeover, the original application server is still running. Thus, in addition to the possible methods described above, there may be additional ways in which the resource data may be passed from the original application server to the new application server.

The new application then uses the msTakeover API, as discussed above, to notify the control server that the session is being taken over (step 506). The control server sends a callback to the original application server to indicate that session takeover has started (step 508). As discussed above, the control server begins queuing all callbacks for the session (step 510), and then returns the number of active handles (i.e. handlecount) to the new application server (step 512). The new application server uses the number of active handles to allocate space for the session handles (step 514), and then calls the msGetSessionHandles API to obtain the list of active handles held by the original application server (step 516).

Once the new application server receives the handles, it uses these handles to build its own information (e.g., resource status and access information) about the session (step 518). After reconstructing information regarding all necessary session resources, the new application server notifies the control server that the takeover is complete by using the msTakeoverComplete API (step 520). After receiving notification that takeover is complete, the control server sends a callback to the original application server to notify it that takeover is complete (step 522). When msTakeoverComplete returns, all queued and future callbacks are then sent from the control server to the routine identified by callBackAddr (step 524).

After a new application server takes over a session, the new application server may enable the session for further takeover using the msEnableTakeover API, as described in FIG. 3. A session may be taken over as many times as necessary by application servers in the same system or in different systems.

The following code segments are presented for illustrative purposes, and are not meant to limit the possible implementations and embodiments of the session takeover process. The following code segment depicts the original application server enabling the session for takeover.

```
/* Original application server - enable session for
   takeover */
msRC = msInit(0, 0, MS_CURRENT_VERSION);
if (msRC != MS_SUCCESS)
{
    printf("msInit failed w/ rc = %d \n", msRC);
    return(msRC);
}
strcpy((char *)serverLocation, "rugrat");
msRC = msOpenSession(serverLocation, NULL,
MS_DEFAULT_ASSET_GROUP,
    NULL, &hSession);
if msRC != MS_SUCCESS)
{
    printf("msOpenSession failed w/ rc = %x \n", msRC);
    return(msRC);
}
eventMask = (msEventMask)MS_SESSION_EVENTS;
msRC = msRegisterCallBack(hSession, eventMask,
&myCallBack);
if (msRC != MS_SUCCESS)
{
printf("=== msRegisterCallBack failed\n");
return(msRC);
}
timeout = 50;
msRC = msEnableTakeover(hSession, timeout, &sessTakeover);
if (msRC != MS_SUCCESS)
```

```
{
    printf("Enable failed w/ rc = %x \n", msRC);
    return(msRC);
}
/* Send the session takeover structure to the       */
/* backup application server                        */
/* Application starts playing, recording, and loading */
/* Then unexpectedly terminates without closing the
session */
```

The following code segments depicts the process of the new application server taking control in the event that the original application server fails.

```
/* Example code for case where original application    */
/* server terminates                                    */
/* Get sessTakeover structure from original application */
/* server. Detect failure of the original application   */
/* server.                                              */
msRC = msInit(0, 0, MS_CURRENT_VERSION);
if (msRC != MS_SUCCESS)
{
    printf("msInit failed w/ rc = %d \n", msRC);
    return(msRC);
}
msRC = msTakeover(sessTakeover, NULL,
    &hSession, &sessTakeoverInfo);
if (msRC != MS_SUCCESS)
{
    printf("Takeover failed w/ rc = %x \n", msRC);
    return(msRC);
}
sessHandles = (msSessTakeoverHandle_t *)
    malloc(sessTakoverInfo.handlecount *
    sizeof(msSessTakoverHandle_t));
msRC = msGetSessionHandles(hSession,
sessTakeoverInfo.handleCount,
    sessHandles);
if (msRC != MS_SUCCESS)
{
    printf("Takeover Handles failed w/ rc = %x \n", msRC);
    return(msRC);
}
tmpSessHandles = sessHandles;
for (I=0; i<sessTakeoverInfo.handleCount; I++)
{
    /* Save information about handles as required   */
    /* by application                                */
    sessHandles++;
}
msRC = msTakeoverComplete(hsession, &myCallBack);
if (msRC != MS_SUCCESS)
{
    printf("Takeover Complete failed w/ rc = %x \n",
msRC);
    return(msRC);
}
/* Takeover is complete. Queued callbacks will     */
/* occur immediately.                              */
```

Although the invention has been described with a certain degree of particularity, it should be recognized that elements thereof may be altered by persons skilled in the art without departing from the spirit and scope of the invention. The code examples above are shown as being implemented in "C" code. However, the use of "C" is for illustrative purposes only. Those skilled in the art will appreciate that any programming language may be used to implement the present invention. One of the embodiments of the invention can be implemented as sets of instructions resident in the random access memory of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for transferring a session, established between a first application server and a client, from the first application server to a second application server, comprising the steps of:
   enabling the session for a transfer;
   obtaining session takeover information from the first application server;
   initiating the transfer when the first application server reaches a transfer causing condition; and
   establishing the session in the second application server by reconstructing information regarding one or more session resources, wherein the information is reconstructed by the second application server using the session takeover information obtained from the first application server.

2. A method according to claim 1, wherein said establishing step further comprises the steps of:
   accessing, by the second application server, the session takeover information;
   determining, based on the session takeover information, one or more necessary resources which must be accessed by the second application server; and
   reconstructing status and access information regarding the necessary resources in the second application server.

3. A method according to claim 2, wherein said determining step comprises the step of obtaining one or more active handles, wherein each active handle represents consumption of one or more session resources.

4. A method according to claim 1, wherein a transfer causing condition occurs when the first application server fails.

5. A method according to claim 1, wherein a transfer causing condition occurs when the first application server requests that the session be transferred from the first application server to the second application server.

6. A method according to claim 1, wherein said initiating step further comprises the step of queuing one or more callbacks for the session.

7. A method according to claim 6, further comprising the step of sending one or more queued callbacks to the second application server after the transfer is complete.

8. A method according to claim 1, wherein the first application server and the second application server are in separate computer systems.

9. A method according to claim 1, further comprising the steps of:
   notifying the first application server that the transfer is being initiated; and
   notifying the first application server that the transfer is complete.

10. A method according to claim 1, further comprising the step of notifying a control server that the transfer is complete.

11. A method for transferring a multimedia session, established between a first application server and a client, from the first application server to a second application server, comprising the steps of:

authorizing the session for transfer;

obtaining session transfer information from the first application server regarding one or more resources associated with the session in the first application server;

determining that the first application server has failed;

accessing the session transfer information; and rebuilding status and access information regarding the resources associated with the session, in the second application server, wherein said rebuilding is based on the session transfer information obtained from the first application server.

12. A method according to claim 11, further comprising the steps of:

notifying a control server that the session is being transferred;

queuing, by the control server, one or more session callbacks during the transfer;

notifying the control server that the transfer is complete; and sending, by the control server, the queued callbacks to the second application server.

13. A method for transferring a multimedia session, established between a first application server and a client, from the first application server to a second application server, comprising the steps of:

authorizing the session for transfer;

obtaining session transfer information from the first application server regarding one or more resources associated with the session in the first application server;

requesting, by the first application server, that the session be transferred to the second application server;

accessing the session transfer information; and rebuilding status and access information regarding the resources associated with the session, in the second application server, wherein said rebuilding is based on the session transfer information obtained from the first application server.

14. A method according to claim 13, further comprising the steps of:

notifying a control server that the session is being transferred;

queuing, by the control server, one or more session callbacks during the transfer;

notifying the control server that the transfer is complete; and sending, by the control server, the queued callbacks to the second application server.

15. A method according to claim 14, further comprising the steps of:

notifying the first application server that the transfer is being initiated; and notifying the first application server that the transfer is complete.

16. An information handling system, comprising:

a client;

a multimedia server, including at least a control server and one or more application servers;

a network, connecting the client to the multimedia server, and providing means for establishing a session between the client and a first application server;

means for enabling the session for a transfer;

means for obtaining session takeover information from the first application server;

means for initiating the transfer when the first application server reaches a transfer causing condition; and means for establishing the session in the second application server by reconstructing information regarding one or more session resources, wherein the information is reconstructed by the second application server using the session takeover information obtained from the first application server.

17. An information handling system according to claim 16, wherein said means for establishing further comprises:

means for accessing, by the second application server, the session takeover information;

means for determining, based on the session takeover information, one or more necessary resources which must be accessed by the second application server; and means for reconstructing status and access information regarding the necessary resources in the second application server.

18. An information handling system according to claim 17, wherein said means for determining comprises means for obtaining one or more active handles, wherein each active handle represents consumption of one or more session resources.

19. An information handling system according to claim 16, wherein a transfer causing condition occurs when the first application server fails.

20. An information handling system according to claim 16, wherein a transfer causing condition occurs when the first application server requests that the session be transferred from the first application server to the second application server.

21. An information handling system according to claim 16, wherein said means for initiating further comprises means for queuing one or more callbacks for the session.

22. An information handling system according to claim 21, further comprising means for sending one or more queued callbacks to the second application server after the transfer is complete.

23. An information handling system according to claim 16, wherein the first application server and the second application server are in separate computer systems.

24. An information handling system according to claim 16, further comprising:

means for notifying the first application server that the transfer is being initiated; and means for notifying the first application server that the transfer is complete.

25. An information handling system according to claim 16, further comprising means for notifying the control server that the transfer is complete.

26. A computer readable medium for controlling the transfer of a session, established between a first application server and a client, from the first application server to a second application server, comprising:

means for enabling the session for a transfer;

means for obtaining session takeover information from the first application server;

means for initiating the transfer when the first application server reaches a transfer causing condition; and means for establishing the session in the second application server by reconstructing information regarding one or more session resources, wherein the information is reconstructed by the second application server using the session takeover information obtained from the first application server.

27. A computer readable medium according to claim 26, wherein said means for establishing further comprises:
   means for accessing, by the second application server, the session takeover information;
   means for determining, based on the session takeover information, one or more necessary resources which must be accessed by the second application server; and
   means for reconstructing status and access information regarding the necessary resources in the second application server.

28. A computer readable medium according to claim 26, wherein said means for determining comprises means for obtaining one or more active handles, wherein each active handle represents consumption of one or more session resources.

29. A computer readable medium according to claim 26, wherein a transfer causing condition occurs when the first application server fails.

30. A computer readable medium according to claim 26, wherein a transfer causing condition occurs when the first application server requests that the session be transferred from the first application server to the second application server.

31. A computer readable medium according to claim 26, wherein said means for initiating further comprises means for queuing one or more callbacks for the session.

32. A computer readable medium according to claim 31, further comprising means for sending one or more queued callbacks to the second application server after the transfer is complete.

33. A computer readable medium according to claim 26, wherein the first application server and the second application server are in separate computer systems.

34. A computer readable medium according to claim 26, further comprising:
   means for notifying the first application server that the transfer is being initiated; and
   means for notifying the first application server that the transfer is complete.

35. A computer readable medium according to claim 26, further comprising means for notifying a control server that the transfer is complete.

* * * * *